H. B. ANDERSON & B. B. BROCKWAY.
AMUSEMENT APPARATUS OR AVIATOR INSTRUCTOR.
APPLICATION FILED JAN. 16, 1909.
1,123,653.
Patented Jan. 5, 1915.
4 SHEETS—SHEET 2.
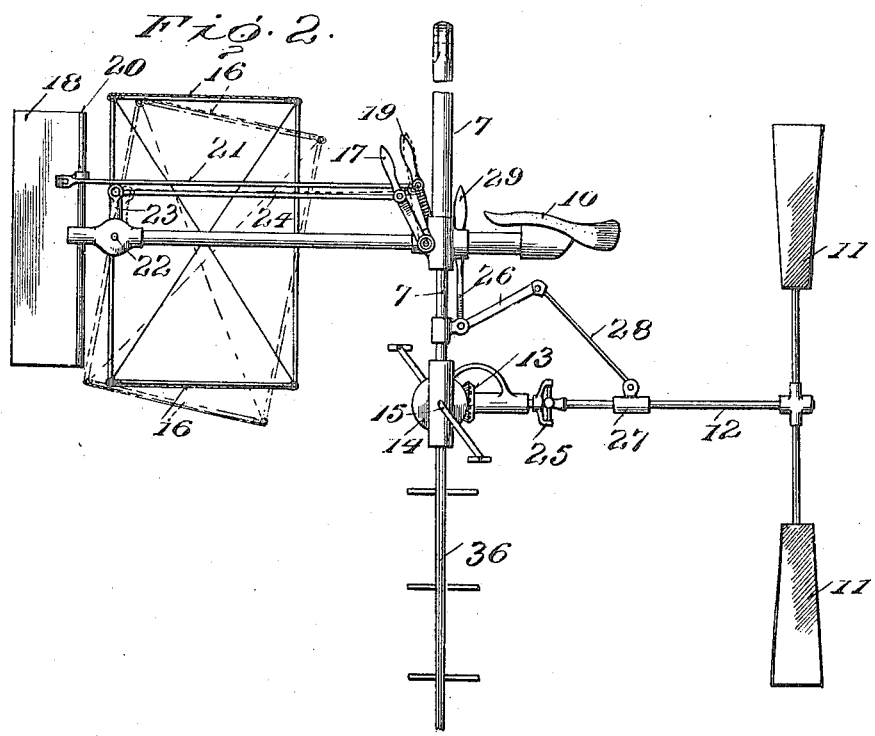

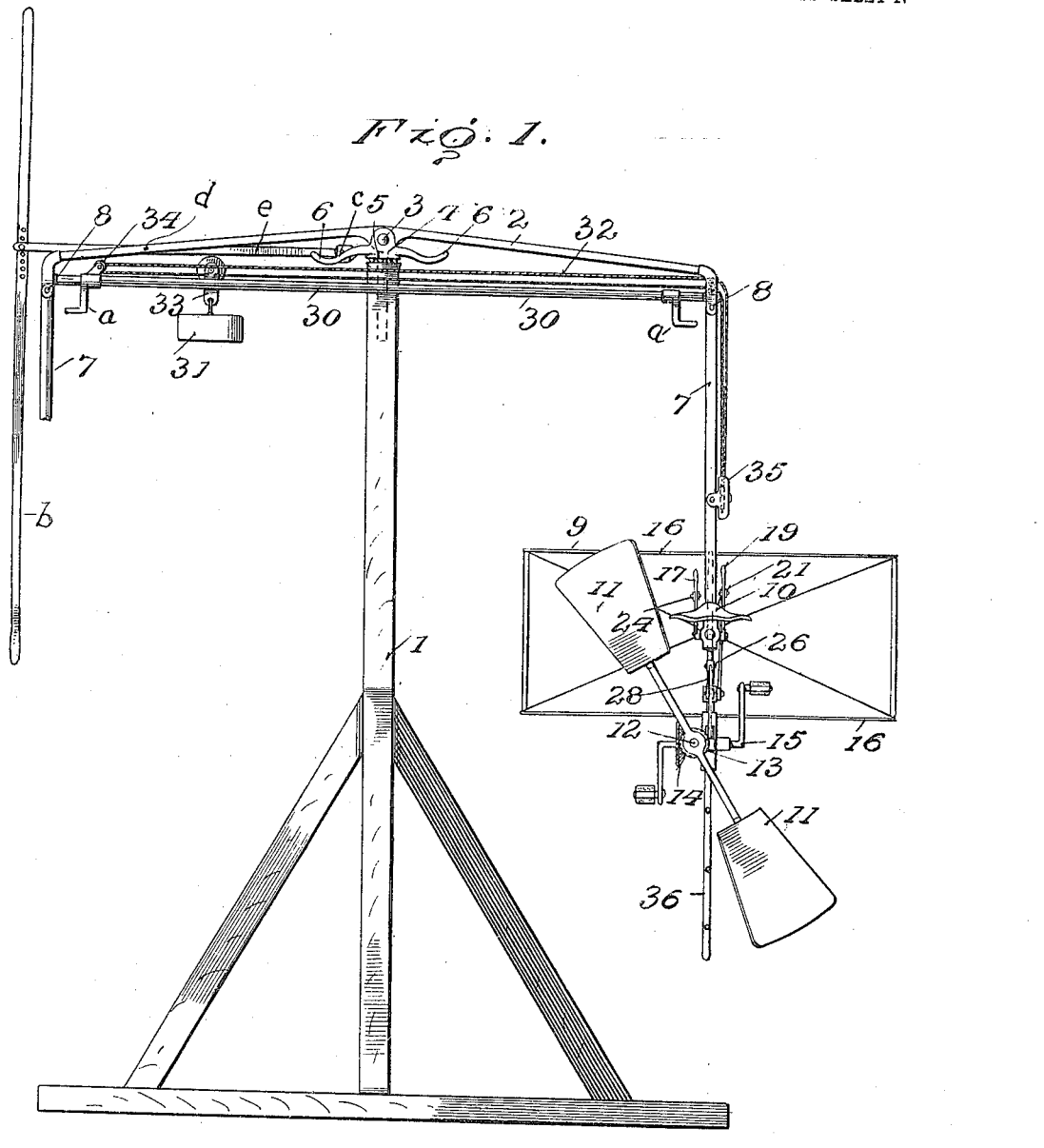

H. B. ANDERSON & B. B. BROCKWAY.
AMUSEMENT APPARATUS OR AVIATOR INSTRUCTOR.
APPLICATION FILED JAN. 16, 1909.
1,123,653.
Patented Jan. 5, 1915.
4 SHEETS—SHEET 3.
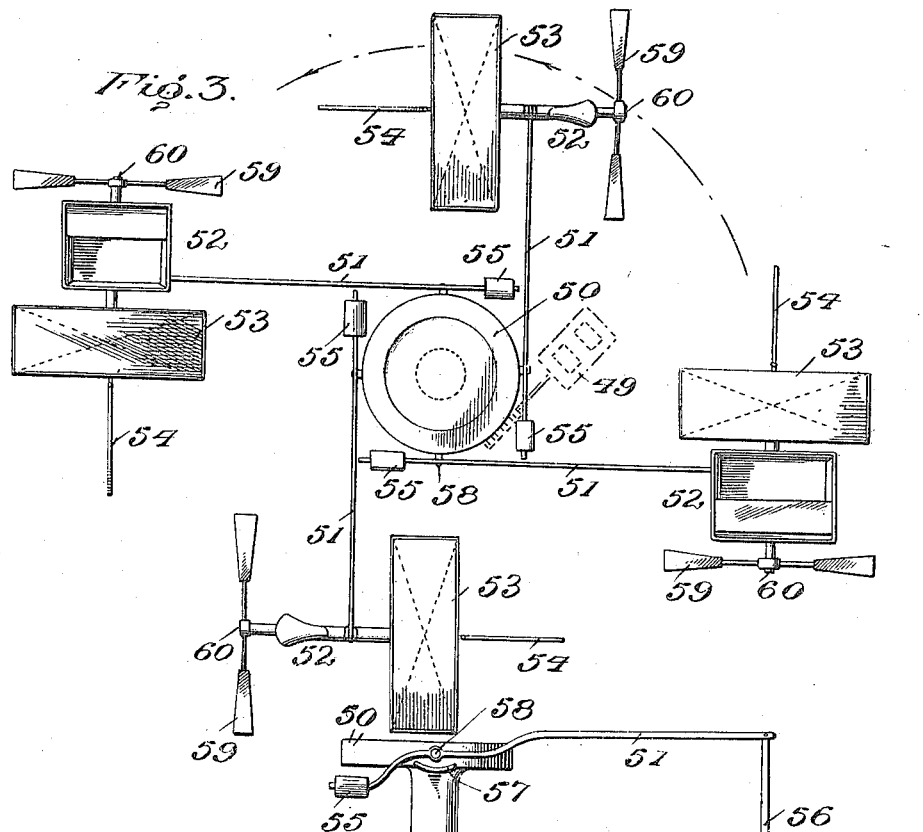
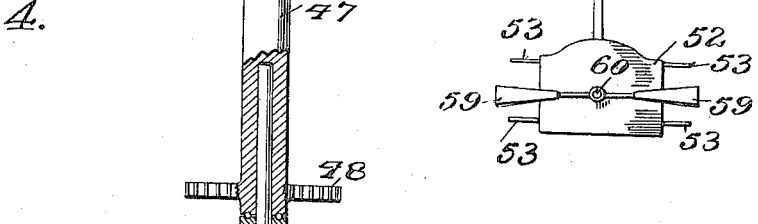

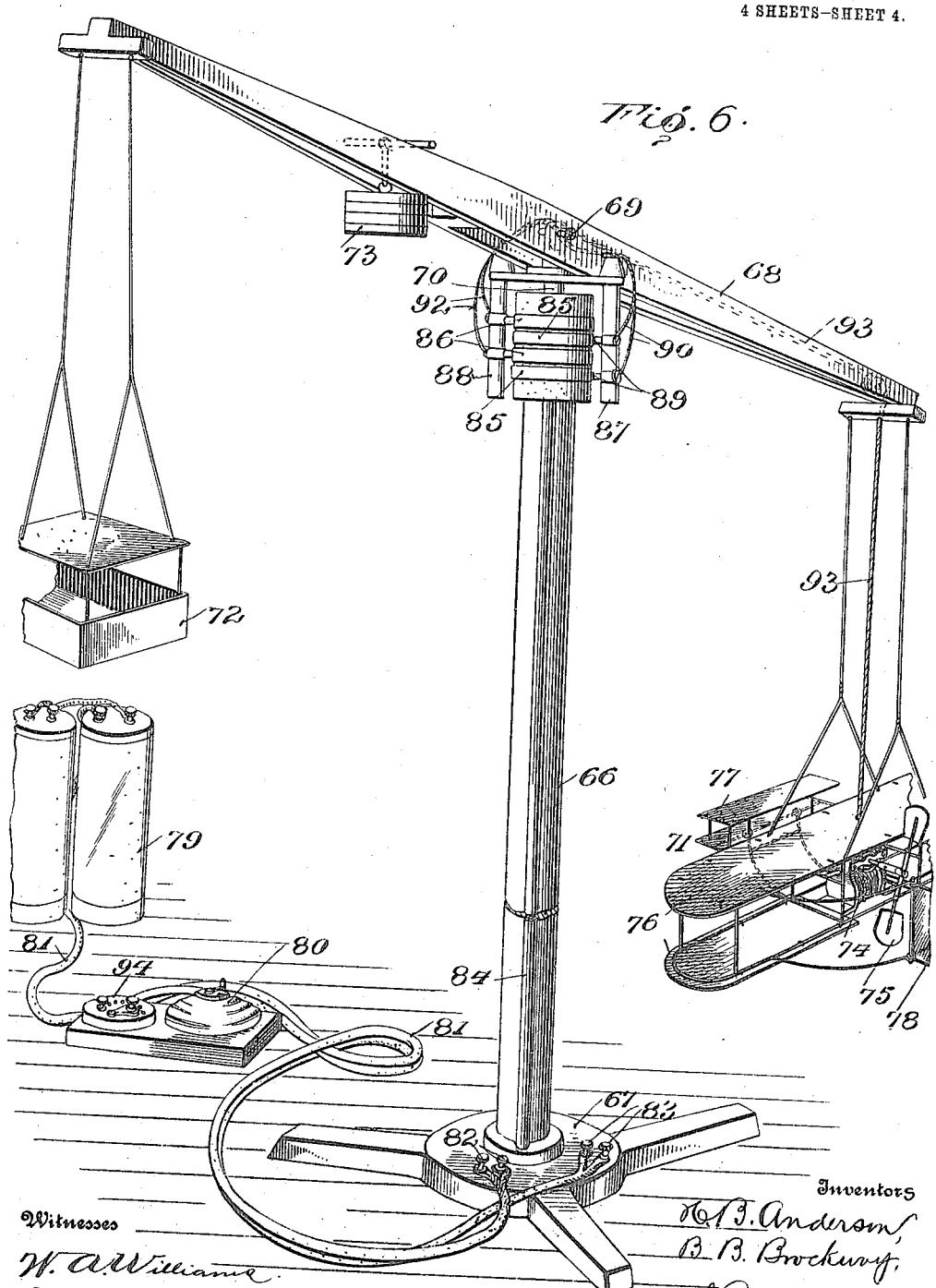

UNITED STATES PATENT OFFICE.

HAROLD B. ANDERSON AND BYRON B. BROCKWAY, OF LAKEWOOD, OHIO, ASSIGNORS, BY MESNE ASSIGNMENTS, TO HAROLD B. ANDERSON, OF CLEVELAND, OHIO.

AMUSEMENT APPARATUS OR AVIATOR-INSTRUCTOR.

1,123,653.  Specification of Letters Patent.  Patented Jan. 5, 1915.

Application filed January 16, 1909. Serial No. 472,711.

*To all whom it may concern:*

Be it known that we, HAROLD B. ANDERSON and BYRON B. BROCKWAY, citizens of the United States, residing at Lakewood, in the county of Cuyahoga and State of Ohio, have invented certain new and useful Improvements in Amusement Apparatus or Aviator-Instructors, of which the following is a specification, reference being had therein to the accompanying drawing.

This invention relates to improvements in amusement apparatus or aviator instructor, the object of which is to produce a mechanism embodying an apparatus adapted to act in a manner similar to an aero-plane flying machine with or without an occupant when used as an amusement device, but embodying an aero-plane flying machine capable of maintaining itself in the air with an occupant when being used as an aviator instructor, and to so construct the mechanism as to eliminate the danger now present in the use of areo-plane flying machines, whether used for amusement or instruction.

In the accompanying drawings, Figure 1, is an elevation of our mechanism, the aero-plane device being shown in rear elevation. Fig. 2, is a detached side elevation of the aero-plane device shown in Fig. 1. Fig. 3, is a top plan view of another form of our apparatus. Fig. 4, is an elevation of a portion of the apparatus shown in Fig. 3. Fig. 5, is a detail view of a portion of another form of our apparatus. Fig. 6, is a perspective view of my apparatus when being used as a toy.

In carrying out my invention, I provide means or mechanism for supporting a device which acts in a manner similar to an aero-plane flying machine so constructed as to permit the said aero-plane device to travel through the air, and to be raised and lowered and moved to the left or to the right in a manner similar to the modern aero-plane flying machine.

In the form shown in Figs. 1 and 2, the mechanism is designed to be used as an amusement device, the aero-plane adapted to carry an operator. In this instance, a suitable support 1 is provided, and at the top of this support is a beam 2 which is adapted to oscillate up and down at its ends upon a centrally-arranged pivot 3. This pivot, as here shown, passes through the beam 2 and a head 4 which is supported upon a suitable bearing 5 here shown to be of the ball-bearing type. This head 4 carries the arms 6 which are located in a vertical plane below the beam 2, and serve to limit the tilting or up and down movement of the beam. Depending from the ends of the beam are the bars 7 which are pivoted to the ends of the beam at the points 8 which will permit the bar 7 to swing in and out in respect to the support 1. Attached to the lower end of the bar 7 is an aero-plane device 9 which, as shown in Figs. 1 and 2, is provided with a saddle 10, a propeller 11, which is connected with a shaft 12, and this shaft 12 has a beveled gear 13 which meshes with a beveled gear 14 carried upon a pedal-driven shaft 15. As shown in Fig. 2, the aero-planes 16 are preferably adapted to be tilted at an angle up or down, as shown in dotted lines Fig. 2, by means of a handle 17 within reach of the operator. In front of the horizontal plane 16 is a vertical plane 18, which acts as a rudder and is adapted to be turned to the right or the left by means of a handle that is connected with the vertical axis 20 of the rudder, by means of the rod 21. The horizontal planes 16 are connected together in any suitable manner, and are pivoted at the point 22, and this pivotal point has a crank-arm 23 which is connected with the handle 17 by means of a rod 24.

Preferably, the propeller-shaft 12 is provided with an intermediate universal joint 25 which will permit the propeller end of the shaft 12 to be raised and lowered as it is being rotated. This is accomplished by means of a bell-crank lever 26 which is suitably connected to the bar 7 and has one end connected with a sliding sleeve 27 on the shaft 12 by means of a link 28, and the opposite end of the bell-crank lever is formed into a handle 29 which is within reach of the operator.

There will be attached to the bar 7, at the opposite end of the beam 2 from the aero-plane device, a receptacle or seat adapted to carry one or more persons (not shown), and a bar 30 located below and extending longitudinally of the beam 2, and traveling with it, will be provided with an adjustable weight 31. This weight can be moved back and forth upon the bar 30 by means of a suitable cable 32 which has its ends connected with the weight carrier 33 and passing around a roller 34 to the opposite end of the beam, and downward and around any suitable device 35 which is within reach of the operator, so that he may operate the cable and move the weight along the rod 30 for the purpose presently described.

Near the ends of the bar 30 are depending L-shaped stops *a* which serve to limit the inward swing of the bar 7.

A bar *e* is pivoted at its inner end *c* to the head 4 and carries intermediate its ends a pivot movable in a slot in the bar 2. The bar *e* carries an adjustable vertical bar *b*. An upward or downward movement of the bar *b* rocks the bar 2 upon its pivot 3 and hence depresses the seat 10 in a position to be conveniently mounted by the operator.

The operation of this device is as follows:—The operator mounts to the seat 10 through the medium of a depending ladder 36. The beam 2 is then balanced by means of the weight 31, whether or not there is any one, or load carried by the opposite end of the beam 2, which in practice will either carry another person or a corresponding load. This balancing places the beam in equilibrium, so that it takes very little to raise or lower the ends of the beam, and consequently very little to raise or lower the aero-plane device 9. In the form shown in Figs. 1 and 2, the operator revolves the propeller 11 by means of the pedal-crank 15, which starts the beam 2 and the aero-plane device traveling in a circle. The beam being in equilibrium, the operator can cause the aero-plane device to raise or lower, or to move in and out in respect to the arc of a circle, by tilting the horizontal planes 16, and by turning the vertical plane 18. It is found that the device must travel with considerable speed in order to have the horizontal plane raise and lower the device, and for the purpose of assisting these planes the propeller shaft 12 may be placed at such inclination as will either lower or raise the device.

From the foregoing, it will be seen that the operator will be able to work the aero-plane device in a manner very similar to the modern aero-plane flying machine, which gives the novel and pleasant sensation of the flying machine, and is to that extent a means of accustoming the operator to the handling of such machines, and enabling the operator to safely operate the device until he feels at home in such machines. Such an apparatus has the elements of instruction combined with the elements of safety, both for pleasure and instruction.

In Figs. 3 and 4 is shown another form of device in which there is provided a rotatable vertical standard 47, the lower end of which is provided with a gear 48 adapted to be driven by any desired mechanism, such, for instance, as a motor 49 shown in Fig. 3, which may be of the electric type.

The upper end of the standard 47 is provided with a suitable head 50 to the edge of which are intermediately pivoted several beams 51. The outer or longer end of the beams will carry a suitable vehicle 52; horizontal aero-planes 53, and a vertical plane 54. A weight 55 is carried by the opposite end of the beam for counter-balancing the vehicle, the aero-planes and the occupants. This vehicle is attached to the beam 51 by means of a depending swinging bar 56 which permits the vehicle to swing in and out. A suitable stop 57 is carried by the head 50 adjacent the pivotal point 58 of the beam 51 to limit the up and down movement of the beam. In this instance the propellers 59 are simply loose on the shaft or journal 60 so that they are caused to revolve as the vehicle is carried through the air by the motor rotation of the vertical standard 47, and the up and down and sidewise movements of the vehicle will be controlled by the horizontal and vertical aero-planes.

Fig. 5 shows in part an apparatus with a pivoted beam 61 adapted to be rotated in a circle by any of the means heretofore referred to, and to the end of which is a swinging depending bar 62 which will carry at its lower end any suitable aero-plane device, and the opposite end of the beam carries an adjustable weight 63 for balancing the aero-plane device and the occupant. In this instance, the movement of the aero-plane device up and down and sidewise may be controlled by a rod or handle 64 which is suitably connected with the rotatable head 65 which carries the beam 61. This handle is within reach of the operator, and the aero-plane can be elevated by pulling on the handle and depressed by pushing up on the handle.

In Fig. 6 is illustrated an amusement device which is intended to be in the form of a toy for use on a table or floor. It consists of a suitable vertical standard 66 which is supported in a suitable base 67. The upper end of this standard carries a swinging beam 68 which is intermediately pivoted at the point 69 to a head 70 which is adapted to rotate on the upper end of the standard 66. An areo-plane device 71 is carried in one end of this beam and a load-carrying device 72 is carried at the other end of this beam. The beam is balanced and placed in equilibrium by means of a suitable adjustable weight 73.

As here shown, the aero-device is provided with a suitable electric motor 74 which drives a propeller 75, and has the horizontal aero-plane 76 somewhat similar to the modern aero-plane flying machine, and the adjustable horizontal aero-plane 77 in front and the adjustable rudder or vertical plane 78 in the rear. While I have referred to front and rear of this device, I desire it to be understood that it may travel in either direction which is controlled by the direction of rotation of the propeller 75. A suitable battery or other electrical source 79 is provided, and this is connected with a rheostat switch 80 of any well known form by means of a suitable electrical connection 81. These electrical connections 81 are connected with suitable binding posts 82 and 83 on the standard 67, and these binding posts are suitably connected with an electrical connection 84 which passes up the standard 66 and has suitable connections respectively with the commutator rings 85 and 86. Depending from opposite sides of the beam 68 are the arms 87 and 88. The arm 87 is provided with suitable commutator brushes 89 which engage the commutator rings 85, and these brushes are suitably electrically connected with the motor by means of the connections 90, whereas the arm 88 is provided with suitable brushes 91 bearing on rings 86 which are electrically connected with the motor by the connections 92. The electrical connections 90 and 92 are formed into a suitable cable 93 but electrically insulated, and this cable passes downward to the motor 74 and is connected therewith.

Also placed within the electric line 81 is a switch 94 for reversing the motor. The rheostat 80 enables the speed of the motor to be controlled. The construction of the rheostat and of the switch, the electric motor, the commutator rings and brushes, is so well understood by those skilled in the art, that a more detailed illustration and description is not necessary here to enable the present invention to be fully understood, since no claim is made to the motor, the switches or the connections.

Having thus described this invention, what is claimed and desired to be secured by Letters Patent, is:—

A mechanism of the character described, comprising a support, an aero-plane supported thereby and movable vertically, horizontally and in and out in respect to said support, and means for limiting its vertical movement and also its inward movement.

In testimony whereof we affix our signatures in presence of two witnesses.

HAROLD B. ANDERSON.
BYRON B. BROCKWAY.

Witnesses:
W. J. WARD,
A. S. NEWTON.

Copies of this patent may be obtained for five cents each, by addressing the "Commissioner of Patents Washington, D. C."